United States Patent
Lim

(10) Patent No.: US 6,700,348 B2
(45) Date of Patent: Mar. 2, 2004

(54) SINGLE-PHASE SWITCHED RELUCTANCE MOTOR DRIVING APPARATUS AND METHOD

(75) Inventor: Jun-young Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 09/783,092

(22) Filed: Feb. 15, 2001

(65) Prior Publication Data

US 2001/0026138 A1 Oct. 4, 2001

(30) Foreign Application Priority Data

Mar. 30, 2000 (KR) ........................................ 2000-16623
Mar. 30, 2000 (KR) ........................................ 2000-16625

(51) Int. Cl.[7] .............................. H02P 1/46; H02P 5/05
(52) U.S. Cl. ........................ 318/778; 318/701; 318/799
(58) Field of Search ................................ 318/794, 786, 318/789, 254, 701, 778, 781, 798, 799, 700, 710

(56) References Cited

U.S. PATENT DOCUMENTS

| | | | | |
|---|---|---|---|---|
| 4,496,895 A | * | 1/1985 | Kawate et al. | 318/781 |
| 5,012,171 A | * | 4/1991 | Sember | 318/696 |
| 5,446,359 A | * | 8/1995 | Horst | 318/254 |
| 5,563,487 A | * | 10/1996 | Davis | 318/254 |
| 5,627,444 A | * | 5/1997 | Fulks | 318/254 |
| 5,701,065 A | * | 12/1997 | Ishizaki | 318/254 |
| 5,760,565 A | * | 6/1998 | Randall | 318/701 |
| 5,955,861 A | * | 9/1999 | Jeong et al. | 318/254 |
| 6,011,377 A | * | 1/2000 | Heglund et al. | 318/254 |
| 6,046,561 A | * | 4/2000 | Zup et al. | 318/701 |
| 6,091,170 A | * | 7/2000 | Mayes et al. | 310/68 B |
| 6,288,513 B1 | * | 9/2001 | Green | 318/254 |
| 6,411,060 B1 | * | 6/2002 | Jung | 318/701 |

FOREIGN PATENT DOCUMENTS

GB    2273212 A   *   6/1994   ............. H02P/7/00

* cited by examiner

Primary Examiner—Kimberly Lockett
Assistant Examiner—Eduardo Colon-Santana
(74) Attorney, Agent, or Firm—Birch, Stewart, Kolasch & Birch, LLP

(57) ABSTRACT

Disclosed is a single-phase switched reluctance motor (SRM) driving apparatus and method which enables a high-speed and high-efficiency SRM and can minimize the switching frequency of elements for driving the SRM. The SRM driving apparatus includes a smoothing circuit section for smoothing an input power supply, a motor driving section for receiving a voltage smoothed by the smoothing circuit section and supplying the voltage to a motor in accordance with a control signal, a plurality of sensors for sensing a rotating speed and a phase of the motor, and a microcomputer for receiving one selected among signals sensed by the plurality of sensors and outputting the control signal for controlling the motor driving section.

9 Claims, 7 Drawing Sheets

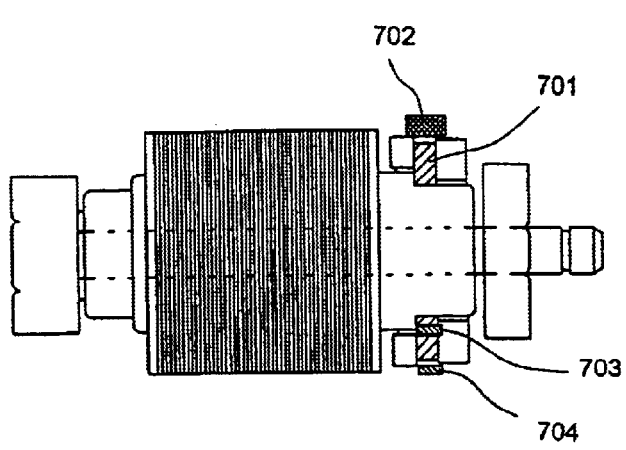
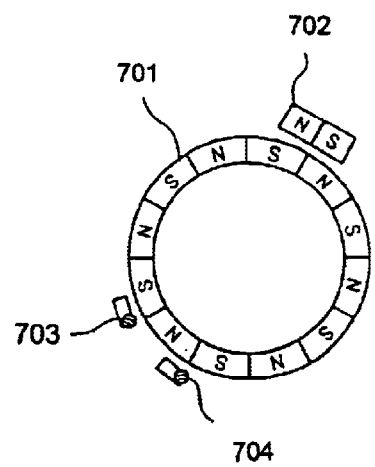
FIG. 7(a)
FIG. 7(b)

SINGLE-PHASE SWITCHED RELUCTANCE MOTOR DRIVING APPARATUS AND METHOD

BACKGROUND OF THE INVENTION

1. Field of the Invention

The present invention relates to an apparatus and method of driving a single-phase switched reluctance motor, and more particularly to a single-phase switched reluctance motor (SRM) driving apparatus and method which enables a high-speed and high-efficiency SRM by employing a plurality of sensors, and which can minimize the switching frequency of elements constituting an SRM driving section.

2. Description of the Related Art

A switched reluctance motor (SRM) is a specific type motor combined with a switching control device, wherein both its stator and rotor have a protruded pole type structure, and there exists no winding or permanent magnet of any type on the rotor part, enabling the SRM to have a very simple structure.

Since the SRM has a very simple structure, it has advantages in productivity. Also, it has a good starting characteristic and a great torque, while it requires little maintenance and repair such as a periodic exchange of brushes and so forth. Also, the structure of its driving apparatus is simplified in comparison to an induction motor driven by an inverter, and it has superior characteristics in torque per volume, efficiency, rating of the converter, etc.

Due to such superior characteristics, the SRM has been increasingly used in various fields in many countries.

FIG. 1 is a block diagram of a conventional single-phase SRM driving apparatus.

Referring to FIG. 1, the conventional single-phase SRM driving apparatus comprises a smoothing circuit section 102 for smoothing an AC current applied from a commercial AC power supply 101 to a DC voltage, a microcomputer 106, a motor driving section 103 for receiving the DC voltage supplied from the smoothing circuit section 102 and a control signal outputted from the microcomputer 106, and driving a motor 104 accordingly, and a Hall sensor 105 for detecting the position and speed of the motor 104, and outputting a detection signal to the microcomputer 106.

The operation of the conventional single-phase SRM driving apparatus as constructed above will be explained in detail with reference to FIG. 1.

The smoothing circuit section 102 smoothes the input voltage of the commercial power supply 101. The smoothed voltage is supplied to the motor driving section 103, and the motor driving section 103 supplies the voltage to the motor 104 in accordance with the control signal from the microcomputer 106.

Then, the Hall sensor 105 detects the rotating speed and phase of the motor 104 to generate a detection signal, and the microcomputer 106 controls the motor driving section 103 in accordance with the signal generated by and received from the Hall sensor 105, so that the motor driving section 103 controls the voltage supplied to the motor 104.

FIG. 2 is a view illustrating the construction of the conventional single-phase SRM and motor driving section.

Referring to FIG. 2, the conventional single-phase SRM motor 300 is a single-phase 6/6-pole SRM composed of a stator 207, a rotor 208, a magnet 209 for position detection, and a parking magnet 210.

The conventional SRM driving section 200 comprises a DC link capacitor 201 for smoothing the AC power supply and outputting a smoothed DC voltage, upper and lower switching elements 202 and 203, connected in parallel to the DC link capacitor 210, for being turned on/off in accordance with a gate driving signal from a switching driving section (not illustrated) which rotates the motor in a forward or backward direction in accordance with a rotor position signal of the SRM, a first diode 204 connected to motor windings 206 for generating a torque according to an on/off operation of the upper and lower switching elements 202 and 203, one terminal of the upper switching element 202, and one terminal of the lower switching element 203, and a second diode 205 connected between the other terminal of the upper switching element 202 and the other terminal of the lower switching element 203.

The operation of the conventional single-phase SRM as constructed above will be explained in detail.

First, if the AC power supply is applied, the DC link capacitor 201 smoothes it to a DC voltage. This smoothed DC voltage is supplied to the motor windings 206 in accordance with the switching operation of the upper and lower switching elements 202 and 203.

Specifically, the upper and lower switching elements 202 and 203 are turned on according to the position of the rotor 208 and the stator 207 of the SRM, and this causes a current path is formed through the DC link capacitor 201, upper switching element 202, motor windings 206, and lower switching element 203. Accordingly, a voltage is excited in the motor windings 206, a magnetic force is generated from the stator 207, and thus the SRM rotates by the magnetic force acting on the rotor 208.

If the upper and lower switching elements 202 and 203 are simultaneously turned off as the SRM rotates, a phase current being applied to the motor windings 206 is eliminated through the first diode 204, motor windings 206, second diode 205, and DC link capacitor 201.

As described above, the conventional SRM is driven by supplying or intercepting the voltage to the motor in accordance with the on/off operation of the upper and lower switching elements 203 and 204 which constitute the motor driving section.

Here, the control signal applied to the upper and lower switching elements 202 and 203 is generated by detecting the rotating speed and the phase of the motor through the Hall sensor as shown in FIG. 1, and the microcomputer pulse-width-modulates the output signal of the Hall sensor and controls the on/off operation of the upper and lower switching elements 202 and 203 in accordance with a duty ratio of pulse width modulation (PWM).

FIG. 3 is a graph illustrating an inductance profile according to the phase change of the conventional single-phase SRM.

Hereinafter, the voltage supplying operation of the motor driving section to the motor will be explained in detail with reference to FIGS. 2 and 3.

According to the SRM having the structure as shown in FIG. 2, when a protruded pole part 207-1 of the stator 207 and a protruded pole part 208-1 of the rotor 208 are in an alignment state, the inductance of the SRM becomes greatest, while when they are in a misalignment state, the inductance becomes smallest.

Also, in the case of the conventional SRM having the 6/6-pole structure, the maximum point and the minimum point of inductance alternately appear every phase of 30°.

In order to drive the SRM, the Hall sensor (not illustrated) detects the position of the rotor 207, generates and outputs the control signal to the microcomputer when a position a of the rotor 207 moves to a position b or b' of the stator 208, i.e., at the time point when the inductance increases. Then, the microcomputer generates the control signal, and supplies the current to the motor windings 206 by controlling the motor driving section to supply the voltage.

FIGS. 4a and 4b are views illustrating a normal parking position and an abnormal position of the single-phase SRM.

When the SRM is stopped, it is parked by mutual attraction acting between an N pole of a parking magnet 401a and an S pole of a magnet 404a fixed to a rotor 402a, and between an S pole of the parking magnet 401a and an N pole of the magnet 404a, respectively, as shown in FIG. 4a, and thus a normal parking state of the SRM is maintained for the next rotation.

However, as occasion requires, when a rotor 402b is stopped, the SRM may be parked by mutual repulsion acting between an N pole of a magnet 404b fixed to the rotor 402b and an N pole of a parking magnet 401b, and between an S pole of the magnet 404b and an S pole of the parking magnet 401b, respectively, and this causes the SRM to be in an abnormal parking state.

As described above, the conventional single-phase SRM has the following problems:

First, in spite of the increase of voltage applied to the motor, the increasing speed of current is slower than that of the voltage, and thus it is difficult to use the conventional SRM for a product that requires a high-speed rotation.

Second, in the conventional high-speed SRM, the switching loss occurs in the upper and lower switching elements due to frequent switching operations since the switching elements are controlled by the adjustment of the PWM duty ratio from a low speed to a high speed, and this causes electromagnetic waves to be greatly generated.

Third, in the case that the rotor of the motor is in the abnormal parking position, the rotor may not rotate further or may operate unstably even if any current flows to the stator for the further rotation of the motor.

SUMMARY OF THE INVENTION

Accordingly, the present invention has been made in an effort to solve the problems occurring in the related art, and a first object of the present invention is to provide a single-phase switched reluctance motor (SRM) driving apparatus and method which enables a high-speed and high-efficiency SRM by driving the SRM with a start sensor and an operation sensor separately provided.

It is a second object of the present invention to provide a single-phase SRM driving method which can minimize the switching frequency of elements for driving the SRM.

It is a third object of the present invention to provide a single-phase SRM driving method which can stably drive the SRM by preventing an abnormal parking of the SRM.

In order to achieve the above objects, according to the present invention, there is provided a single-phase SRM driving apparatus comprising a smoothing circuit section for smoothing an input power supply, a motor driving section for receiving a voltage smoothed by the smoothing circuit section and supplying the voltage to a motor in accordance with a control signal, a plurality of sensors for sensing a rotating speed and a phase of the motor, and a microcomputer for receiving one selected among signals sensed by the plurality of sensors, and outputting the control signal for controlling the motor driving section.

In another aspect of the present invention, there is provided a single-phase SRM driving method comprising the steps of (a) sensing a rotating speed and a phase of a motor through a plurality of sensors and producing sensed signals, (b) selecting one among the plurality of sensors, receiving the sensed signal produced from the selected sensor, and producing a control signal for controlling a voltage supplied to the motor, (c) detecting the rotating speed of the motor, and comparing the sensed rotating speed with a reference speed determined by a system, and (d) selecting another sensor if the sensed rotating speed of the motor is faster than the reference speed as a result of comparison at step (c), and producing a control signal for controlling the voltage supplied to the motor in accordance with the sensed signal produced from the selected sensor.

In still another aspect of the present invention, there is provided a single-phase SRM driving method comprising the steps of (a) initially aligning a rotor and a stator of a motor when a power supply is inputted, (b) waiting for a predetermined time after the rotor and the stator of the motor are aligned at step (a), (c) applying a secession pulse for an initial start of the motor after the predetermined time elapses, (d) receiving a signal produced from a first sensor, and increasing a rotating speed of the motor started at step (c) by adjusting a duty ratio of pulse width modulation (PWM) of the signal, (e) comparing the rotating speed of the motor with a reference speed determined by a system, and (f) if the rotating speed of the motor is faster than the reference speed as a result of comparison, receiving a signal produced from a second sensor, and controlling the rotating speed of the motor in a dwell time.

BRIEF DESCRIPTION OF THE DRAWINGS

The above objects and advantages of the present invention will become more apparent by describing in detail preferred embodiment thereof with reference to the attached drawings in which:

FIGS. 7a and 7b are sectional views of the single-phase SRM and the permanent magnet part according to the present invention;

DETAILED DESCRIPTION OF THE PREFERRED EMBODIMENT

Reference will now be made in greater detail to the preferred embodiment of the present invention with reference to the accompanying drawings.

Figure 5:
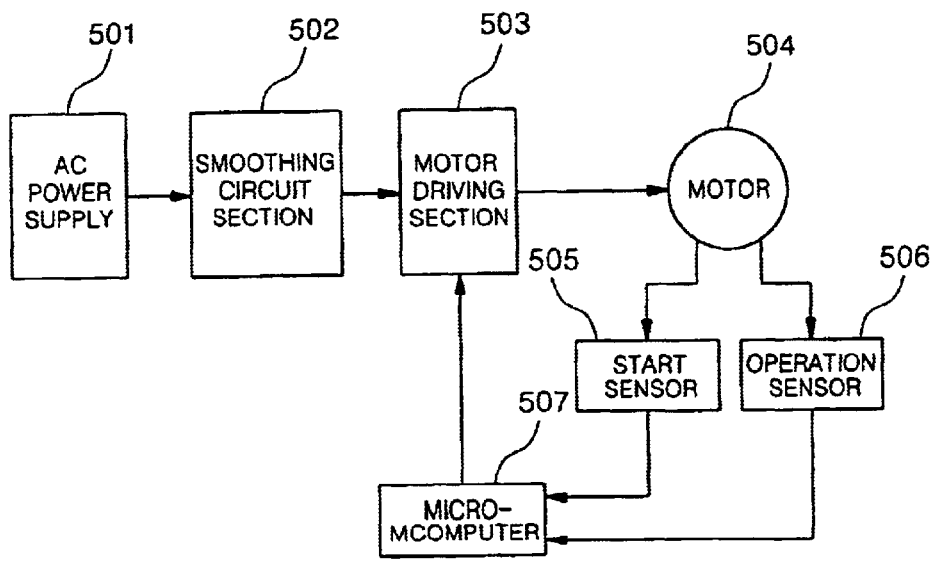
FIG. 5 is a block diagram of the single-phase SRM driving apparatus according to the present invention.

FIG. 5 is a block diagram of the single-phase SRM driving apparatus according to the present invention.

Referring to FIG. 5, the single-phase SRM driving apparatus according to the present invention comprises a smoothing circuit section 502 for smoothing an AC voltage supplied from a commercial AC power supply 501 to a DC voltage, a microcomputer 507, a motor driving section 503 for receiving the DC voltage supplied from the smoothing circuit section 502 and a control signal from the microcomputer 507 and driving a motor 504 accordingly, a start sensor 505 and an operation sensor 506 for detecting a rotating speed and a phase of the motor 504 and outputting detected signals to the microcomputer 507.

Hereinafter, the operation of the single-phase SRM driving apparatus according to the present invention will be explained in detail with reference to FIG. 5.

First, the smoothing circuit section 502 smoothes the input AC power supply 501, and supplies the smoothed voltage to the motor driving section 503. The motor driving section 503 supplies the voltage to the motor 504 in accordance with the control signal outputted from the microcomputer 507.

Thereafter, the start sensor 505 and the operation sensor 506 detect the rotating speed and the phase of the motor 504 and output corresponding sensed signals. At this time, the start sensor 505 and the operation sensor 506 detect different phases of the rotor. Specifically, the operation sensor 506 detects the phase preceding the start sensor 505.

The sensed signals produced from the start sensor 505 and the operation sensor 506 are inputted to the microcomputer 507. At an initial start of the motor, the microcomputer 507 selects the signal outputted from the start sensor 505, and produces the control signal for controlling the motor driving section 503.

As described above, if the motor driving section 503 is driven by the signal detected by the start sensor 505, it causes trouble in the product that rotates at a high speed due to the problem of the current increase supplied to the motor windings (not illustrated). Thus, the microcomputer 507 selects the signal produced from the start sensor 505 as its input at the initial start of the motor 504, and produces the control signal for controlling the motor driving section 503.

If the motor speed exceeds the predetermined reference speed, the microcomputer 507 selects the signal produced from the operation sensor 506 as its input, and outputs the control signal for controlling the motor driving section 503.

Figure 6:
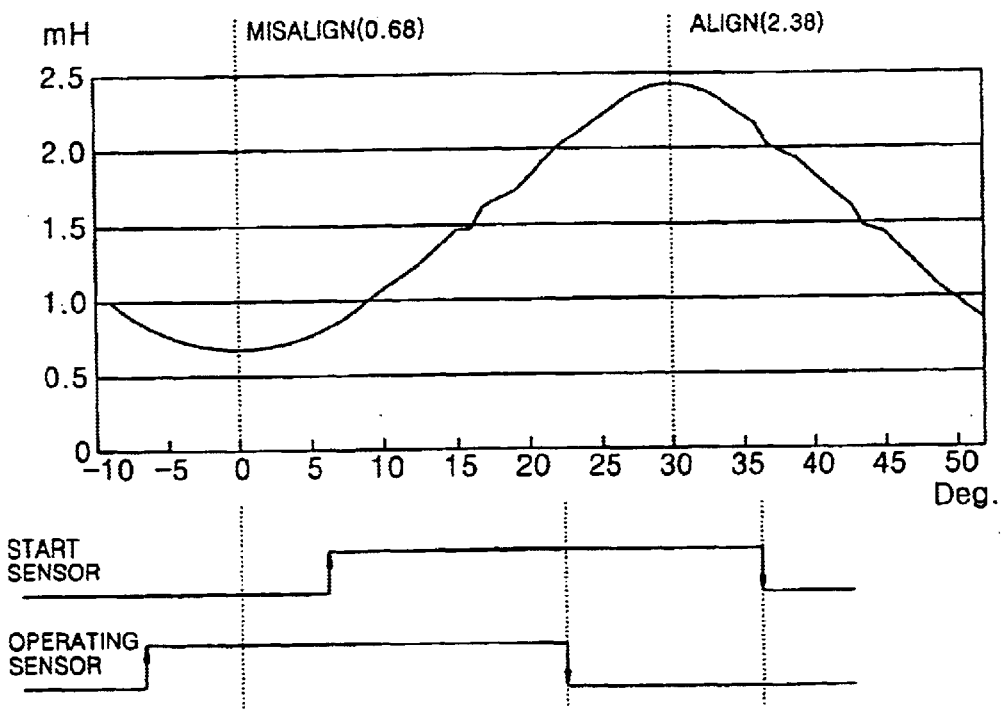
FIG. 6 is a view illustrating the inductance change in accordance with the phase change of the single-phase SRM and signals produced from the start sensor and the operation sensor according to the present invention.

FIG. 6 is a view illustrating the inductance change in accordance with the phase change of the single-phase SRM and signals produced from the start sensor and the operation sensor according to the present invention.

Hereinafter, the operation of the single-phase SRM driving apparatus according to the present invention will be explained in detail with reference to FIGS. 5 and 6.

The inductance becomes lowest when the protruded pole part of the rotor and the protruded pole part of the stator are accurately in a misalignment state. At the time point when the inductance becomes increased, the motor driving section supplies the voltage to the motor to flow the current to the motor windings.

The start sensor 505 adopted in the single-phase SRM driving apparatus according to the present invention detects the phase where the inductance starts to increase and produces the detected signal, and the operation sensor 506 detects the phase that precedes the phase detected by the start sensor 505.

As described above, the start sensor 505 and the operation sensor 506 detect the rotating speed and the phase of the motor and produce the detected signals to the microcomputer 507. The microcomputer 507 selects one of the detected signals produced from the two sensors 505 and 506 as its input in accordance with the rotating speed of the motor 504, and outputs the control signal to the motor driving section 503.

In selecting the signals produced from the start sensor 505 and the operation sensor 506, the microcomputer 507 selects the signal of the start sensor 505 if the RPM of the SRM is in the range of 1,000 RPM~2,000 RPM, while it selects the signal of the operation sensor 506 if the RPM of the SRM exceeds the above range.

FIGS. 7a and 7b are sectional views of the single-phase SRM and the permanent magnet part according to the present invention. In FIG. 7a, the reference numeral '701' denotes a magnet for position detection, '702' a parking magnet, '703' an operation sensor, and '704' a start sensor.

Figure 8:
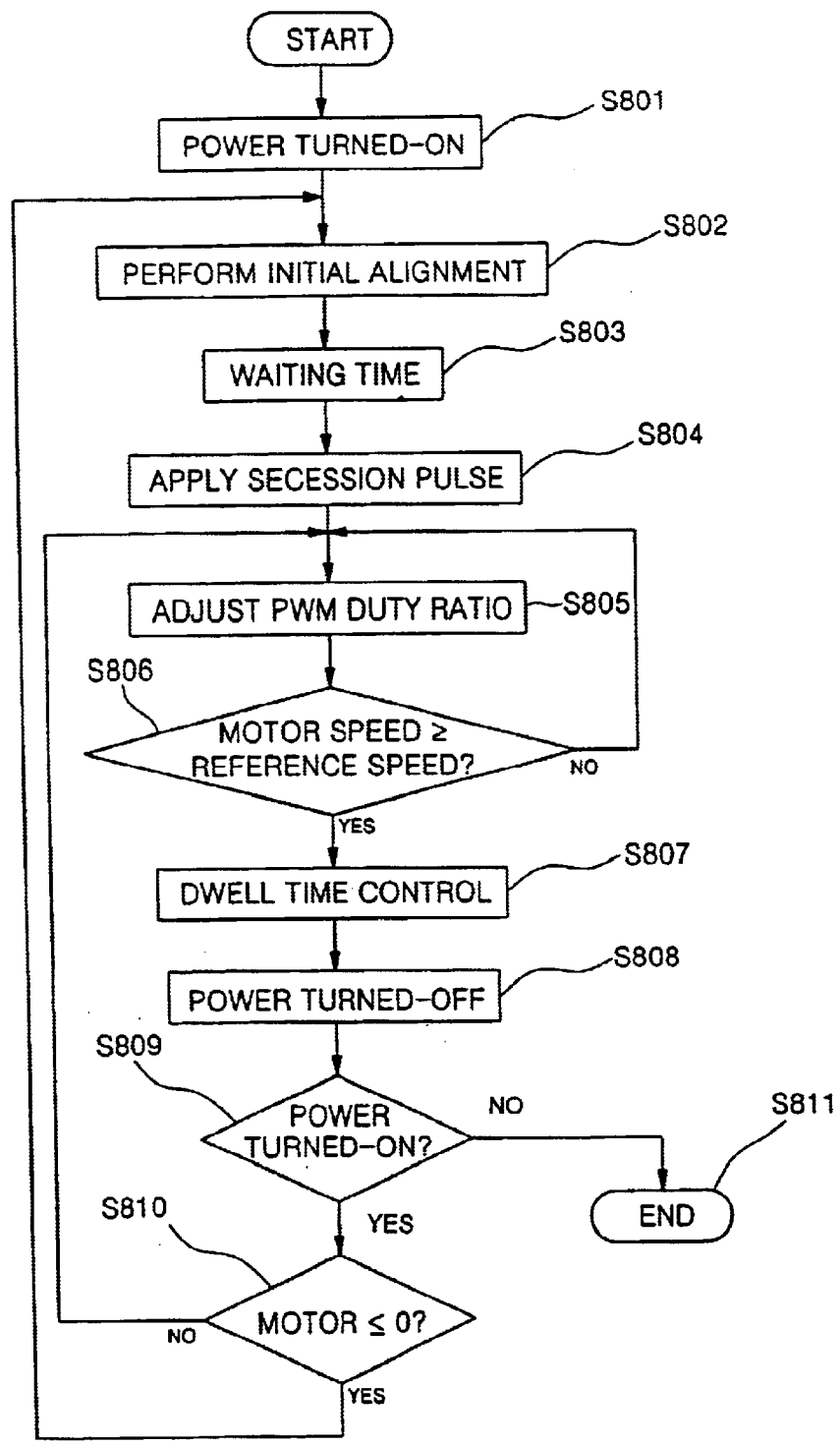
FIG. 8 is a flowchart illustrating the method of driving the single-phase SRM driving apparatus having the construction as shown in FIG. 5 according to the present invention.

FIG. 8 is a flowchart illustrating the method of driving the single-phase SRM driving apparatus having the construction as shown in FIG. 5 according to the present invention.

Referring to FIGS. 5 and 8, the single-phase SRM driving method according to the present invention will be explained in detail.

If the power supply is turned on to drive the single-phase SRM (step 801), the initial alignment is performed (step 802). The reason for performing the initial alignment is that there exists a point where the torque is zero due to the characteristic of the magnet fixed to the rotor of the SRM. In other words, it is to solve the problem of the abnormal parking due to the repulsion between the parking magnet and the magnet fixed to the rotor.

As a method for the initial alignment, the current is momentarily supplied to the motor windings by outputting a number of small pulses to the upper and lower switching elements of the motor driving section 503.

Figure 4A:
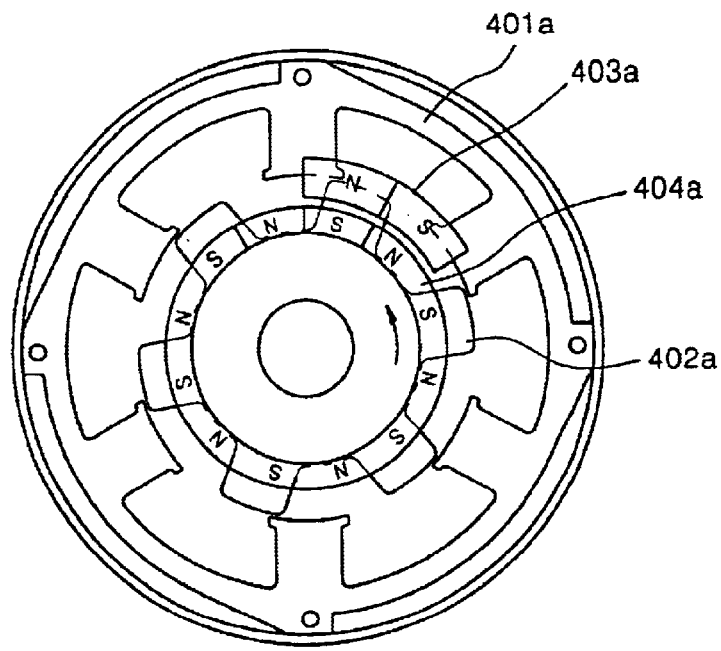
FIGS. 4a and 4b are views illustrating a normal parking position and an abnormal position of the single-phase SRM.
Figure 4B:
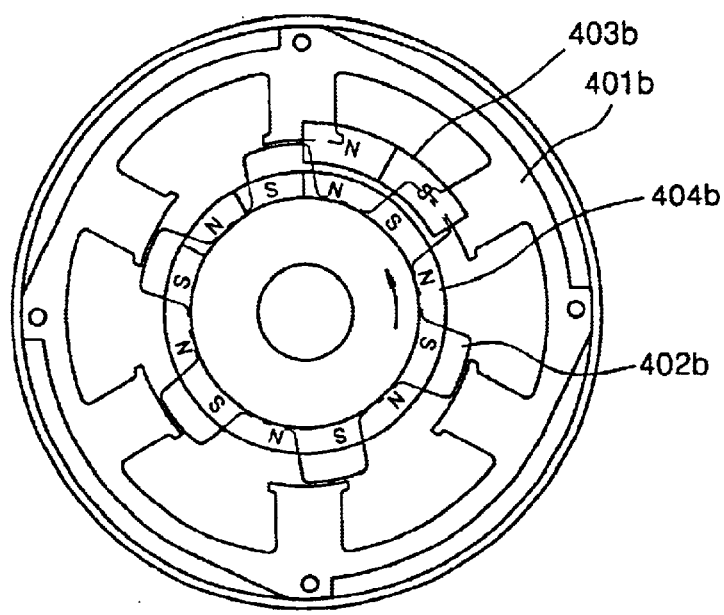

After the initial alignment is completed at step 802, a predetermined waiting time is given so that the rotor moves to the normal parking position as shown in FIG. 4b (step 803). In the embodiment of the present invention, the waiting time is determined to be about one second.

If the rotor is positioned to the normal parking position as above, a big pulse (secession pulse), i.e., a large amount of current is applied to the motor windings so that the rotor can rotate from the parking position (step 804).

If the secession pulse is applied to the motor driving section 503 as described above and an instantaneous torque is generated, the rotor starts to rotate. Then, the rotating speed of the rotor is gradually increased by performing the PWM of a small duty and then continuously increasing the duty ratio of the PWM (step 805).

Here, the PWM duty ratio is determined by the following equation.

$$D_{ratio} = \frac{T_{on}}{T_{on} + T_{off}} \quad \text{[Equation 1]}$$

Figure 1:
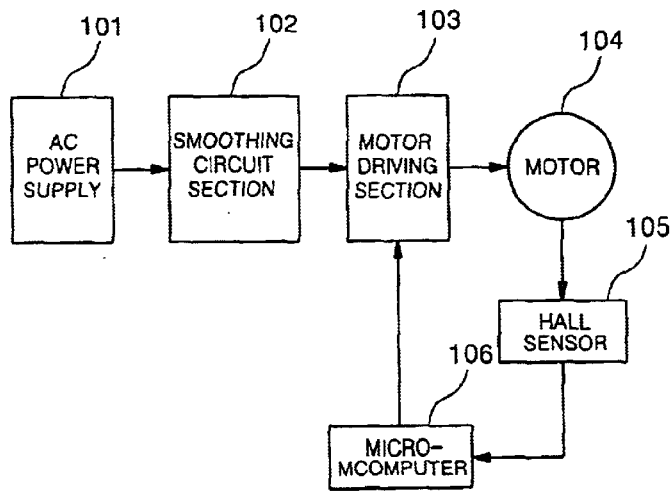
FIG. 1 is a block diagram of the conventional single-phase SRM driving apparatus.
Figure 2:
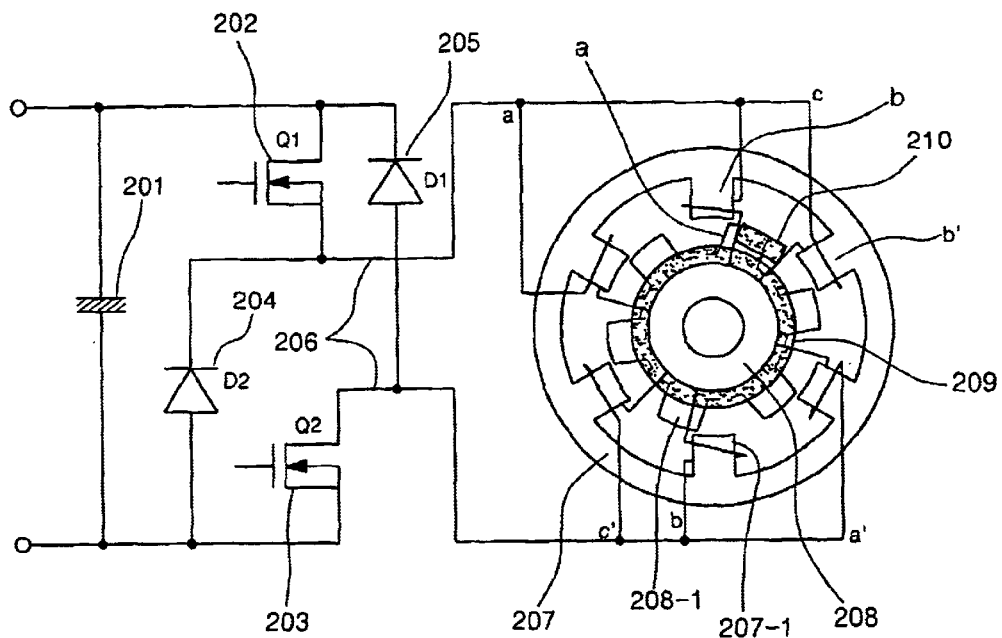
FIG. 2 is a view illustrating the construction of the conventional single-phase SRM and motor driving section.
Figure 3:
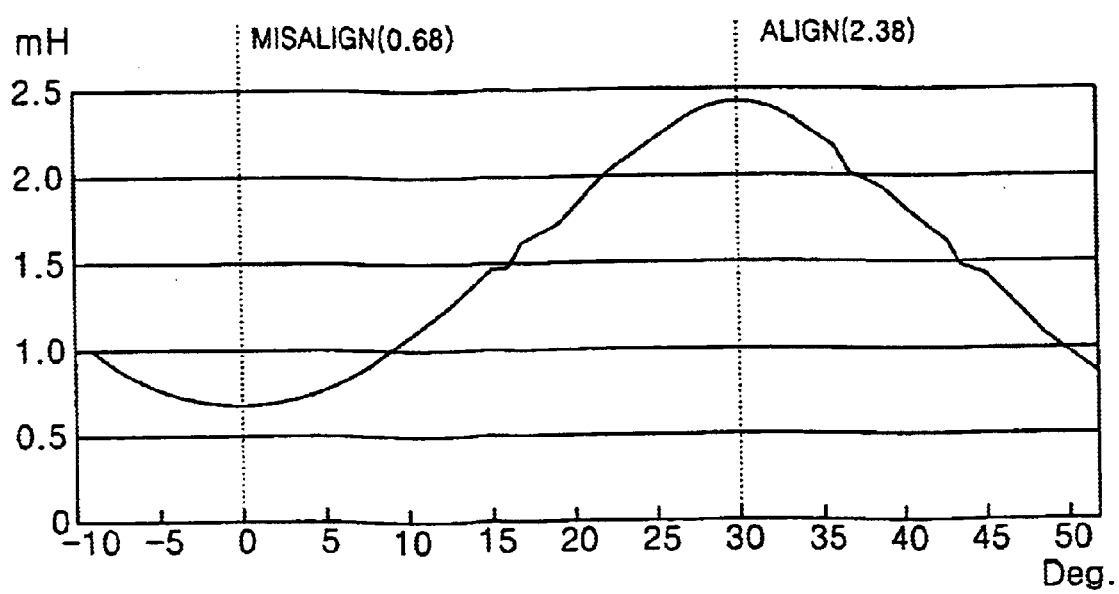
FIG. 3 is a graph illustrating an inductance profile according to the phase change of the conventional single-phase SRM.

In equation 1, $D_{ratio}$ represents a duty ratio, $T_{on}$ a time period where the upper and lower switching elements of the motor driving section having the construction as shown in FIG. 2 are turned on, $T_{off}$ a time period where the upper and lower switching elements are turned off. As shown in Equation 1, since the value of the denominator is constant, the duty ratio is determined by the value of the numerator $T_{on}$.

Accordingly, the increase of the duty ratio corresponds to the lengthening of the 'turned-on' time of the upper and lower switching elements, and this means that a much more current flows to the motor windings and the rotor rotates more rapidly.

Also, the above-described PWM is performed in a period taken from a rising edge of the start sensor to a falling edge thereof.

Then, the rotating speed and the phase of the motor is detected using the start sensor, and the detected rotating speed is compared with the reference speed determined by the system (step 806).

If the detected rotating speed of the motor is faster than the reference speed as a result of comparison at step 806, the base of commutation is changed from the start sensor to the operation sensor, and a dwell time control is performed, while if the detected rotating speed is slower than the reference speed, the process of adjusting the PWM duty ratio is continuously performed.

The dwell time control is performed in a manner that the current is supplied or cut off at a time for a time determined by the microcomputer instead of turning on or off the switching elements according to the PWM duty ratio. In comparison to the PWM, the dwell time control greatly reduces the number of switching operations of the switching elements of the motor driving section.

Here, the dwell time control is used if the next value can be estimated by the previously read value. The reason why the base of commutation is changed from the start sensor to the operation sensor during the dwell time control is that it is difficult to estimate the next value from the previously read value due to the frequent RPM change in the event that the start sensor is the base of commutation.

Thereafter, if the external power supply is turned off (step 808), it is judged whether the external power supply is turned on again (step 809).

If the external power supply is not turned on again as a result of judgement at step 809, the SRM drive is terminated (step 811), while if it is judged that the external power supply is turned on again at step 809, it is judged whether the motor is kept to rotate (step 810).

If it is judged that the motor is stopped at step 810, the process is fed back to step 802, and the above-described steps including the initial alignment are repeatedly performed, while if it is judged that the motor is not stopped, the process is directly fed back to step 805, and the above-described steps are repeatedly performed since the steps 802, 803, and 804 are not required any further.

Figure 9:
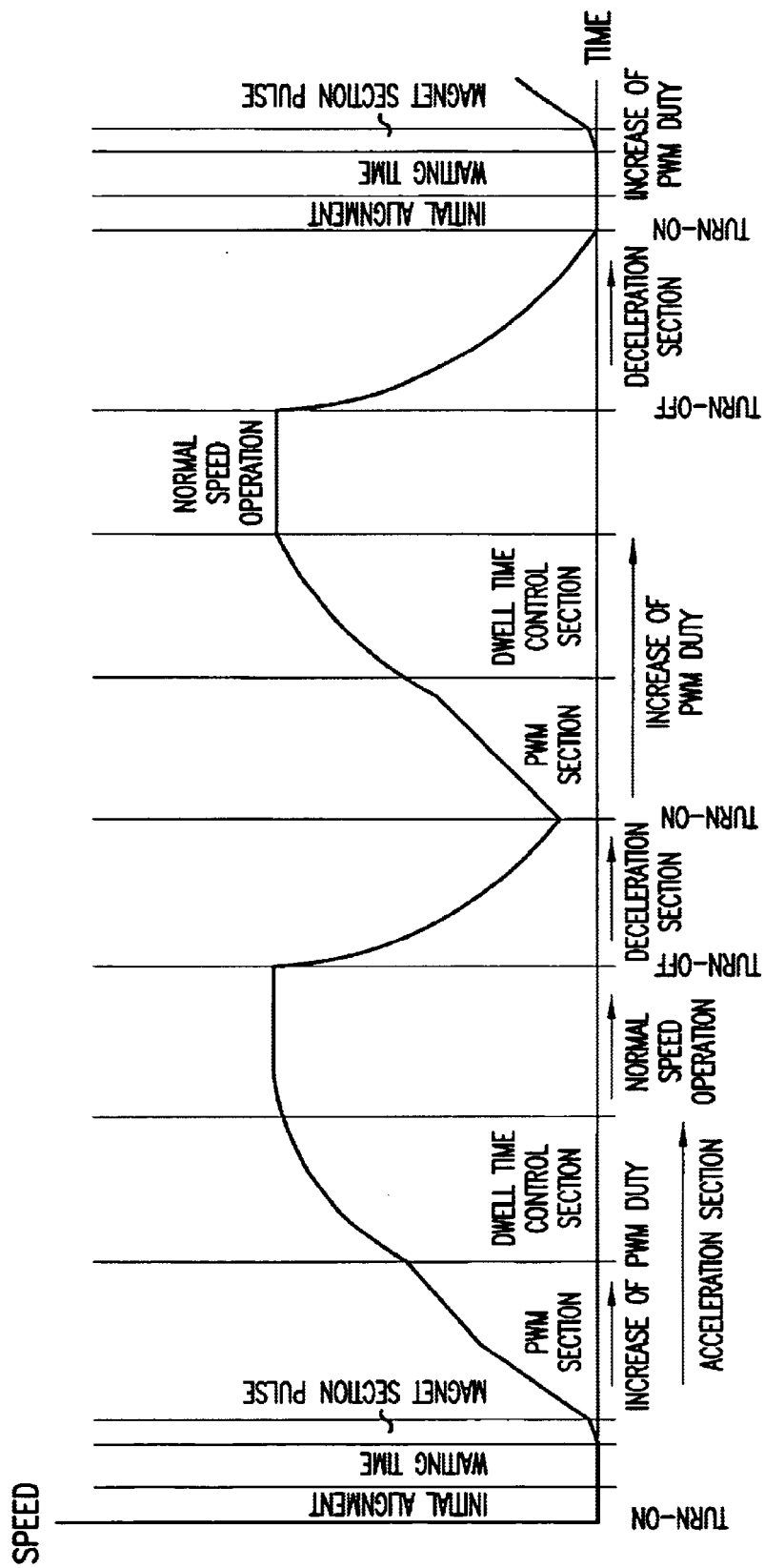
FIG. 9 is a graph explaining the single-phase SRM driving method according to the present invention.

FIG. 9 is a graph illustrating the single-phase SRM driving method according to the present invention as described above.

While this invention has been described in connection with what is presently considered to be the most practical and preferred embodiment, it is to be understood that other modifications thereof may be made without departing from the scope of the invention. Thus, the invention should not be limited to the disclosed embodiment, but should be defined by the scope of the appended claims and their equivalents.

What is claimed is:

1. A single-phase switched reluctance motor (SRM) driving method comprising the steps of:
   (a) sensing a rotating speed and a phase of a motor through a plurality of sensors and producing sensed signals;
   (b) selecting a first sensor among the plurality of sensors, receiving the sensed signal produced from the first sensor, and producing a control signal for controlling a voltage supplied to the motor;
   (c) detecting the rotating speed of the motor, and comparing the sensed rotating speed with a reference speed determined by a system;
   (d) selecting a second sensor if the sensed rotating speed of the motor is faster than the reference speed as a result of comparison at step (c), and producing a control signal for controlling the voltage supplied to the motor in accordance with the sensed signal produced from the first or second sensor and thereby controlling a single driving current, wherein a signal produced from the first sensor selected is continuously received if the sensed rotating speed of the motor is slower than the reference speed as a result of comparing the sensed rotating speed with the reference speed.

2. The method as claimed in claim 1, wherein the plurality of sensors sense different phases of the motor.

3. The single-phase switched reluctance motor driving method according to claim 1, wherein the first sensor is a start sensor and the second sensor is an operation sensor and said reference speed of said motor is within a range of 1000 RPM to 2000 RPM.

4. A single-phase switched reluctance motor (SRM) driving method comprising the steps of:
   (a) initially aligning a rotor and a stator of a motor when a power supply is inputted;
   (b) waiting for a predetermined time after the rotor and the stator of the motor are aligned at step (a);
   (c) applying a secession pulse for an initial start of the motor after the predetermined time elapses;
   (d) receiving a signal produced from a first sensor, and increasing a rotating speed of the motor started at step (c) by adjusting a duty ratio of pulse width modulation (PWM) of the signal;
   (e) comparing the rotating speed of the motor with a reference speed determined by a system; and
   (f) receiving a signal produced from a second sensor, and controlling the rotating speed of the motor in a dwell time with a single driving current if the rotating speed of the motor is faster than the reference speed as a result of comparison.

5. The method as claimed in claim 4, further comprising the steps of:
   (g) judging whether the power supply is again turned on if the power supply is turned off after step (f);
   (h) judging whether the motor is stopped if the power supply is turned on at step (g); and
   (i) feeding back to step (d), and repeatedly performing steps (d) through (h) if the motor is not stopped at step (h).

6. The method as claimed in claim 5, further comprising the step of feeding back to step (a) and repeatedly performing steps (a) through (h) if it is judged that the motor is stopped at step (h).

7. The method as claimed in claim 4, wherein the initial alignment is performed in a manner that a number of small pulses are applied to the motor driving section so that the current flowing to motor windings does not become excessive.

8. The method as claimed in claim 4, further comprising the step of continuously receiving a signal produced from a first sensor, and controlling the rotating speed of the motor by adjusting the PWM duty ratio.

9. The single-phase switched reluctance motor driving method according to claim 4, wherein the first sensor is a start sensor and the second sensor is an operation sensor and said reference speed of said motor is within a range of 1000 RPM to 2000 RPM.

* * * * *